W. S. HENRY.
INDIVIDUAL PROTECTIVE ARRANGEMENT FOR INTERLOCKED FUNCTIONS.
APPLICATION FILED MAY 3, 1912.
1,163,147.
Patented Dec. 7, 1915.
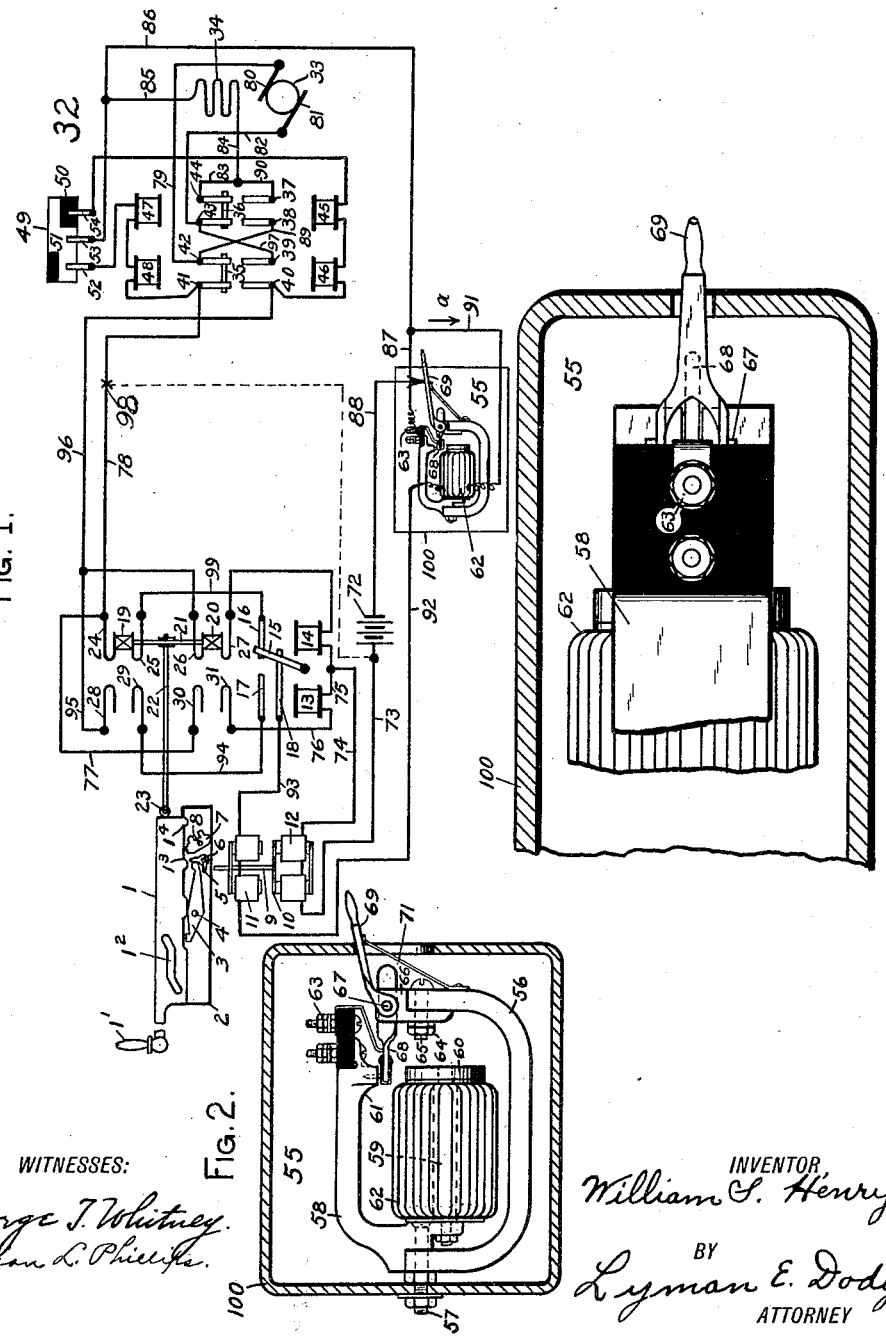

UNITED STATES PATENT OFFICE.

WILLIAM S. HENRY, OF ROCHESTER, NEW YORK, ASSIGNOR TO GENERAL RAILWAY SIGNAL COMPANY, OF GATES, NEW YORK, A CORPORATION OF NEW YORK.

INDIVIDUAL PROTECTIVE ARRANGEMENT FOR INTERLOCKED FUNCTIONS.

1,163,147.  Specification of Letters Patent.  Patented Dec. 7, 1915.

Application filed May 3, 1912. Serial No. 694,864.

*To all whom it may concern:*

Be it known that I, WILLIAM S. HENRY, a citizen of the United States, and a resident of the city of Rochester, in the county of Monroe and State of New York, have invented a new and useful Individual Protective Arrangement for Interlocked Functions, of which the following is a specification.

This invention relates generally to systems of interlocking used upon railways for controlling the position of signals and the movable parts of the track, said signals and movable parts being commonly called "functions."

It is particularly related to an individual means for the protection of each function from improper movements.

The primary object of this invention is the production of a device of the class described, which may be so arranged and connected in an interlocking system, that upon the flow of current from an improper source to the function which it protects, the function will be automatically disconnected from one terminal of the source of current used to operate and control it and will be maintained disconnected without in any way affecting any other functions operated from the same station of which it may be one unit, until the flow of current from the improper source is stopped.

A further object of the invention is to so connect and arrange the device, that it will be impossible for a person to tamper with the device after it has operated automatically so as to again permanently connect the disconnected function to the source of current until the improper flow of current has ceased.

Interlocking systems at present in use have combined therewith protective apparatus which is adapted to disconnect all functions from the source of current upon the occurrence of certain crosses, or an improper application of energy to the conductors connected to a function. Such protective apparatus includes means individual to each particular function for causing the disconnection of the source of current from all functions.

There are systems of protective arrangements whereby it is impossible after current has been automatically disconnected from all functions, to again connect the source of current to any function until the improper flow of current, which caused the disconnection, has been interrupted.

In large and extensive interlocking systems, it is undesirable to disconnect the source of current from all functions when only one function is liable to an improper operation, for which reason at present large and extensive plants are divided into sections, and the protective apparatus so arranged that an improper flow of current to a function of one of the sections merely renders those functions included in that particular section, inoperative.

The division of a large interlocking plant into sections is advantageous but it is not the ideal arrangement, for even with such division, each section includes a number of functions, and a defect affecting any one function, is liable to cause delay to a number of trains by rendering inoperative functions that are in no wise unsafe for the passage of trains. By the use of applicant's invention, however, the very least delay possible to trains will be caused for only the particular function which is liable to be improperly operated upon an unauthorized application of energy is rendered inoperative and, consequently, all functions which are not interlocked so as to require the previous movement of the deranged function may be kept in service for the operation of trains.

All protective systems employed in interlocking systems should be so designed and connected that after they have properly performed their function of disconnecting the source of current from all functions, there will be no opportunity for unauthorized manipulation of the protective devices so that the function can again be connected with the source of current until the fault which caused operation of the protective device has been removed. Applicant's invention provides a protective device which is so designed, constructed and arranged that tampering or wrong handling by unskilled persons, is prevented.

In the drawing accompanying this specification,—Figure 1 is a diagrammatic representation of a system of circuits and associated apparatus employing applicant's invention for operating and controlling an interlocked function, here shown as a switch movement; Fig. 2, is a side elevational view of a device employed in the system, and Fig.

3, is a fragmentary plan view of the same device.

Similar characters of reference refer to like parts throughout the several views.

1, designates a lever or slide having a handle $1^1$, by which it may be reciprocated, and having a cam slot $1^2$, by which the ordinary mechanical locking well known to those skilled in the art, may be operated in such manner as to lock levers conflicting with a particular position of lever 1 and to unlock these levers not conflicting with a particular position of lever 1, all of which is well understood by those skilled in the art. It, of course, being understood that lever 1 is only one of a number of mechanically interlocked levers governing the switches and signals in an interlocking plant.

2, designates a guide for constraining the lever 1 to move in its proper path and for supporting the well known indication mechanism consisting of the latch 3, pivoted on the guide 2 by means of the pin 4, the dog 5 pivoted on the guide 2 by means of the pin 6, and the pawl 7 pivoted on the guide 2 by means of the pin 8.

All of the above mentioned indication mechanism is so arranged and designed that by the coöperation of the latch 3 with the shoulders $1^3$ and $1^4$, the lever 1 will be prevented from moving either beyond the normal indication position when being moved toward the full normal position or beyond the reverse indication position when being moved toward the full reverse position until the rod 9 is raised by the attraction of the armature 10 by the energization of electromagnet 11, all of which is fully shown and described in the patent to John D. Taylor, #752,127 dated February 16th, 1904, in which patent the function of the safety magnet 12 is also fully explained.

13 and 14 designate two coils of an indication selector, of which 15 designates the movable armature and 16, 17 and 18 designate fixed contacts, all of which are fully shown, described and claimed in the patent to John D. Taylor, #832,175, dated October 2, 1906.

19 and 20 designate two conducting blocks carried by the cross bar 21 which is rigidly attached to rod 22, which in turn is rigidly connected by means of pin 23 to the lever 1. The conducting blocks 19 and 20, in the position as shown, complete an electrical connection between contact springs 24 and 25 and 26 and 27 respectively, but when the lever 1 is moved either to the reverse indication position or the full reverse position, the blocks 19 and 20 make contact between contact springs 28 and 29 and 30 and 31 respectively.

32 designates generally a track switch operating mechanism, and consists of a motor having an armature 33, a field coil 34, movable conducting strips 35 and 36, fixed contacts 37, 38, 39, 40, 41, 42, 43 and 44. The pole changer coils 45, 46, 47 and 48 and the circuit controller 49 consisting of insulating material 50 bearing a conducting strip 51 and contact springs 52, 53 and 54, adapted to at times connect with the conducting strip 51. All of the above described parts relating to the switch movement generally, are fully shown and described in the patent to John D. Taylor, #800,246, dated September 26th, 1905.

55 designates generally, the protective apparatus which, when properly connected, according to applicant's invention with the remaining parts of the system, affords the desired protection and accomplishes the desired results.

Referring to Fig. 2, numeral 56 designates a permanent magnet having an arm 58 fastened to one extremity by means of bolt 57, and 59 designates an iron core, bearing a pole piece 60. Upon the core 59, coil 62 is placed and so wound that current flowing through the coil in one direction will cause armature 68 to remain in the upper position as shown, but current flowing in the other direction will cause the armature 68 to move so that the left hand end contacts with pole piece 60, in which position it will remain until manually restored.

Upon one end of the permanent magnet 56, by means of nut 64, and bolt 65, a bearing of magnetic material 66 is fastened, which supports a pin 67, upon which is supported, so as to turn freely, the armature of magnetic material 68 and the arm 69. The arm 69 is formed so as to inclose the armature 68 as shown in Fig. 3 so that if the armature 68 rests against the pole 60, it will then rest against the under side of arm 69 so that if the arm 69 is then moved downwardly, as viewed in Fig. 2, the armature 68 will be moved upwardly against the pole 61. The arm 69 is under constant tension by reason of spring 71, which spring tends to hold it in the position as shown in Fig. 1, and in Fig. 2.

In order to prevent an operator from holding armature 68 against pole 61, when current is flowing which would move it against pole 60, the whole device is inclosed in a case 100. The only part of mechanism 55 which protrudes from the case is the arm 69, so that the only control which an operator may have over armature 68, is that control which he obtains by means of arm 69.

The polarized device designated generally by 55 with the exception of arm 69 and spring 71 is fully shown, described and claimed in the patent granted to William S. Henry, No. 1,038,811, dated June 25, 1912.

With all of the parts as shown in Fig. 1, that is in the normal position, no current is flowing from the source 72, but if the lever 1 is moved to the reverse indication position, moving with it the rod 22, the cross bar 21 and the conducting blocks 19 and 20, a current will flow in the following path: positive terminal of battery 72, wire 73, safety magnet 12, wires 74 and 75, indication selector coil 13, wire 76, spring 31, conducting block 20, spring 30, wire 77, wire 78, spring 41, strip 35, spring 42, wire 79, brush 80, armature 33, brush 81, wire 82, spring 43, strip 36, spring 44, wires 83 and 84, field coil 34, wires 85, 86, 87, binding post 63, armature 68, arm 69 and wire 88 to the negative terminal of the battery. Current flowing in the above traced path causes the armature 33 to revolve in the well known manner, moving the conducting strips 35 and 36 into contact with fixed springs 39 and 40 and 37 and 38 respectively, and after having moved the function to which the armature is connected, to then generate a dynamic current by reason of its momentum, which current flows in the following path: armature 33, brush 80, wire 79, contact spring 42, wire 89, contact spring 38, conducting strip 36, contact spring 37, wires 90 and 84, field coil 34, wires 85, 86 and 91, coils 62, wire 92, indication magnet 11, wire 93, fixed contact strip 18, movable contact armature 15, which has been moved by the flow of operating current, fixed contact strip 17, wire 94, spring 29, block 19, wires 95 and 96, contact spring 40, strip 35, wire 97, contact strip 43, wire 82 and brush 81 to armature 33. Current in the above traced path energizes the indication magnet 11 in the well known manner causing the armature 10 to be raised and causing the rod 9 to strike dog 5 and release latch 3 so that the lever 1 may be moved to its full reversed position in a manner well understood and fully described in the patent to Taylor #752,127 above mentioned.

It will be noticed that the indication current above mentioned flows in the wire 91, in the direction of the arrow $a$. The current flowing in such direction through the coil 62 is flowing in such a direction that the armature 68 which is polarized by reason of its connection with permanent magnet 56 will be held in the position as shown in Figs. 1 and 2 and, consequently, the path from wire 87 to wire 88 is not destroyed as there is no movement of the armature 8, consequently the return path for current from the function to the source of current is not interrupted. If the armature 68 were caused to reverse by the normal flow of indication current, then every time a function was operated and sent in an indication current to release a lever, it would be necessary for the manipulator of lever 1 to manually restore the armature 68 before attempting to again move the function.

If a wire, such as 101, carrying current forming a part of the system of which lever 1 is an element, were connected to the wire 78 as at 98 with all of the parts in the position as shown in Fig. 1, there would be two paths open to it to the negative terminal of the battery 72; one, by means of wire 78, contact spring 41, strip 35, spring 42, wire 79, brush 80, armature 33, brush 81, wire 82, spring 43, strip 36, spring 44, wires 83 and 84, field coil 34, wires 85, 86 and 87, binding post 63, armature 68, arm 69 and wire 88; the other from wire 78 to spring 24, conducting block 19, spring 25, wire 99, fixed strip 16, conducting armature 15, fixed strip 18, wire 93, indication magnet 11, wire 92, coil 62, wires 91 and 87, binding post 63, armature 68, arm 69, and wire 88 to the negative terminal of the battery. The resistances of the two above traced paths could bear any suitable ratio one to the other depending upon circumstances, but in all cases the resistances of the two paths would be such that enough current would flow through the last traced path to energize coil 62 sufficiently to cause pole 60 to move armature 68 downwardly as viewed in Figs. 1 and 2, breaking the connection between wire 87 and armature 68, thereby destroying the continuity of both of the above traced paths to the negative terminal of the source 72.

As soon as armature 68 is moved to the reverse position as above described, a path for the improper current to the negative terminal of the battery would be broken, thereby preventing an improper movement of the switch operating mechanism and at the same time the function 32 could not be operated by means of lever 1, for the return path for the current from function 32 would be broken at armature 68. In order to be able to operate the function 32, it would then be necessary to move the arm 69 downwardly as viewed in Figs. 1 and 2, thereby returning armature 68 to the position as shown in Figs. 1 and 2, but in so returning armature 68 to its normal position, contact is broken between wire 88 and arm 69, and it cannot be restored until arm 69 is allowed to be returned to its normal position by means of spring 71, but if upon returning to its normal position, however, and thereby completing the circuit from wire 87 to the negative terminal of the battery 72, the cross at 98 has not been removed, the armature 68 will again be moved to reverse position as before, so that it will be impossible to operate function 32 until both the cross 98 has been removed and armature 68 returned to its normal position and the arm 69 allowed to return to its normal position, so that it is impossible for an operator to so manipulate the device 55 as to allow an operation of the function 32 while a cross exists upon the wire 78. It has heretofore been pointed out that mechanism 55 is inclosed in a case from which only the arm 69 protrudes. On account of such construction the only means for moving armature 68 from position in contact with pole 60 to a position in contact with pole 61, is the arm 69 so that it is impossible for an operator to manipulate the protective device in a manner not intended.

The operation of the lever 1 and the operation of the function 32 when a movement is made from reverse to normal, is readily understood from the Fig. 1 in connection with the description already given of the movement from normal to reverse, it suffices to merely say, that the indication current generated flows in the same direction as when a movement from normal to reverse is made and a cross or connection carrying current to wire 96 when the function 32 is in its reverse position and strips 35 and 36 are in their reverse position, would have exactly the same effect as would a cross as described at 98.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In an interlocking system, a source of current, an electrically operable function, an individual return connection from said function to the source of current, an indication mechanism, a connection from the function to said indication mechanism, a coil interposed in said indication mechanism connection, a movable member operated by a flow of current in said coil in a predetermined direction to cause a break in said return connection from the function to the source of current, magnetic means arranged to control said movable member and to hold it yieldingly in its different positions, means for restoring said movable member to its normal position after it has been operated and thereby restoring the broken connection, said last named means including a circuit breaker in said connection from the source of current to the function moved to break circuit by said restoring.

2. In a protective device, a permanent magnet, an armature of magnetic material pivoted to said permanent magnet, means coöperating with said magnet to cause said armature to assume a normal position and a reverse position, means having a normal position and a reverse position adapted when moved from normal to reverse to return said armature from reverse position to normal position, a circuit, said armature and said second named means when both are in normal position adapted to complete said circuit, and when either is out of normal position to break said circuit.

3. In an electric interlocking system, a source of electric current, means actuated by current from the source which at a predetermined point in its movement automatically disconnects itself from the source and then generates an electric current, connection between said means and the source, a path for said generated current, a device included in said path having a coil through which said generated current flows, an armature held in a normal position by said generated current flowing through said coil and a movable arm adapted when in normal position to allow said armature to move freely but adapted when moved to reverse position to force said armature to normal position, said armature being moved to a reverse position by current flowing in said coil in a direction opposite to said generated current, said armature and movable arm when in normal position completing the connection from said source to said first named means, but interrupting said connection when either is out of normal position.

4. In an electric interlocking system, in combination; a source of current; an electrically operated function; an individual return connection from said function to said source of current; a circuit including said return connection and closed when said function is at rest; a device having a coil interposed in said circuit; a circuit controlling polarized armature included in said return connection, said armature being controlled by said coil and operated by a flow of current therein in a certain direction to break said return connection; means for restoring said armature to its normal position; and means arranged to break said return connection and operated by said restoring means as long as said restoring means holds said armature in its normal position.

5. In an electric interlocking system, in combination; a source of current; an electrically operated function; an individual return connection from said function to said source of current; a circuit including said return connection and closed when said function is at rest; a protective device comprising a permanent magnet; a coil and a movable armature controlled by said coil, said coil being interposed in said circuit, said armature having a normal position and an operated position and being moved to its operated position by a flow of current in said coil in a certain direction, said armature being yieldingly held in both its normal and its operated positions by said permanent magnet; a normally closed circuit controller interposed in said return connection and directly connected to said armature, said circuit controller being opened by said armature when said armature is moved to its operated position; a movable member for replacing said armature in its normal position; and means for maintaining a break in said return connection until said movable member ceases to hold said armature in its normal position.

6. In an electric interlocking system, in combination; a source of current; an electrically operated function; an individual return connection from said function to said source of current; a circuit controlling lever for governing the movements of said function; indication mechanism for said lever; an indication circuit including said return connection and closed when said function and said lever are at rest; a coil interposed in said indication circuit; a circuit controlling armature controlled by said coil and opened when current flows in said coil in a certain direction; means for yieldingly holding said armature in its operated position, said armature being arranged to open a break in said return connection when operated; manually operable means for replacing said armature to its normal position in which said return connection is unbroken; and a circuit controlling device for opening and closing a break in said return connection, said circuit controlling device being operated by said replacing means and being opened when said replacing means is in its replacing position.

7. In an electric interlocking system, in combination; a source of current; an electrically operated function; operating wires for carrying current from said source to said function; an individual return connection from said function to said source of current; a conducting path leading to said return connection; a circuit controlling lever for governing the movements of said function and arranged to connect said operating wires one at a time alternately to said source of current and said conducting path respectively; a coil included in said conducting path; a movable armature controlled by said coil and operated by the flow of current therein in a certain direction; means for yieldingly holding said armature in its normal and in its operated position; a circuit controller connected to said armature and operated thereby to open and close a break in said return connection; restoring means for replacing said armature in its normal position; and means operated by said last-mentioned means for opening and closing another break in said return connection as said armature is replaced and released respectively.

8. In an electric interlocking system, in combination; a source of current; an electrically operated function; individual operating wires and a return connection associated with said function; a circuit controlling lever for governing the movements of said function and a pole changer mechanism operated by said function, said lever and said pole changer mechanism being arranged and adapted to regulate the flow of current from said source to said function and to maintain a predetermined direction of flow of current in said operating wires and said return connection; electromagnetic means associated with said operating wires and said return connection and responsive to the direction of flow of current therein, said electromagnetic means being unaffected by all proper currents which flow in the direction determined by said lever and said pole changer mechanism, said electro-magnetic means being operated by a flow of improper current in the direction opposite to the direction of flow of the proper current; means operated by said electromagnetic means for interrupting the normal continuity of said return connection, a device controlling said means and tending to hold said means in its different positions, whereby said means when operated by said electromagnetic means is held in its operated position until restored; and manually operable means for restoring said last mentioned means to its normal position without permanently establishing the normal continuity of said return connection unless said electromagnetic means is free to operate.

WILLIAM S. HENRY.

Witnesses:
LILLIAN L. PHILLIPS,
VERA E. SCOTT.

Copies of this patent may be obtained for five cents each, by addressing the "Commissioner of Patents, Washington, D. C."